United States Patent [19]

Behle

[11] 4,372,025
[45] Feb. 8, 1983

[54] LIGHT SOURCE TO LOCATE NOZZLE IN TANK

[75] Inventor: Gunter R. Behle, St. Peters, Mo.

[73] Assignee: ACF Industries, Incorporated, New York, N.Y.

[21] Appl. No.: 244,500

[22] Filed: Mar. 16, 1981

[51] Int. Cl.³ .................... B23Q 17/00; B23Q 3/00
[52] U.S. Cl. ...................................... 29/407; 29/464
[58] Field of Search ............... 29/407, 464, 464, 467, 29/468, 720, 759; 33/227, 236, 180 R; 72/37

[56] References Cited

U.S. PATENT DOCUMENTS

| | | | |
|---|---|---|---|
| 3,448,280 | 6/1969 | Blitchington | 29/407 |
| 3,728,027 | 4/1973 | Watanabe | 356/13 |
| 3,824,666 | 7/1974 | Roopvoets et al. | 29/200 |
| 3,909,952 | 10/1975 | Lagasse | 33/227 |
| 4,326,557 | 4/1982 | Behle | 137/316 |

Primary Examiner—Lowell A. Larson
Assistant Examiner—Steven E. Nichols
Attorney, Agent, or Firm—Henry W. Cummings

[57] ABSTRACT

An opening is formed in a tank bottom and a mounting flange for a bottom outlet valve is attached to the tank bottom extending into this opening. This valve mounting flange contains fastener openings. A vertically extending light source is removably attached to the mounting flange, for example with mechanical fasteners. This light source is shined upwardly into the tank and indicates a reference point on the internal surface of the tank top for locating a nozzle opening. This reference point is marked, and a top opening is then formed in the tank shell by workmen located in the tank, usually after rotating the tank 180°. If the tank has been rotated prior to forming the top opening, the tank is again rotated 180° to locate the top opening at the top of the tank. An optional reinforcing plate is then welded to the outside surface of the tank surrounding the top opening. This reinforcing plate contains a reinforcing plate opening. A hollow cylindrical nozzle is then located within the reinforcing plate opening and/or the tank top opening. An alignment fixture including a target is then inserted into the nozzle. The light source from below the tank bottom is then shined into the nozzle and onto the target located in the nozzle. When the light source is pointed at the center portion of the target, the nozzle is tack welded to the tank top and/or reinforcing plate. The light source is then removed from the mounting flange and the fixture is removed from the nozzle. The nozzle is then finish welded to the reinforcing plate and/or to the tank shell. A seal assembly and an operating rod are then inserted into the nozzle. The operating rod is connected to a lading valve in the tank bottom in a known manner.

20 Claims, 11 Drawing Figures

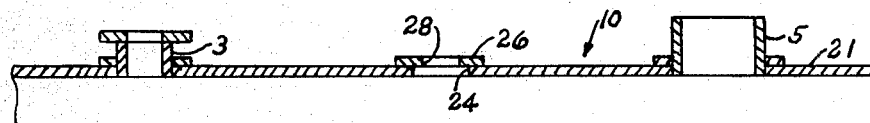
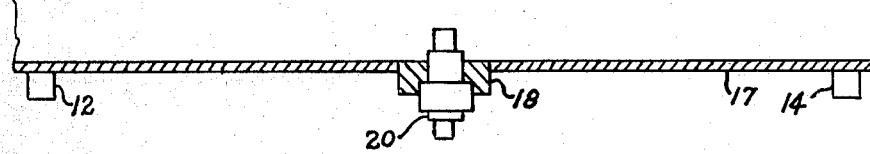
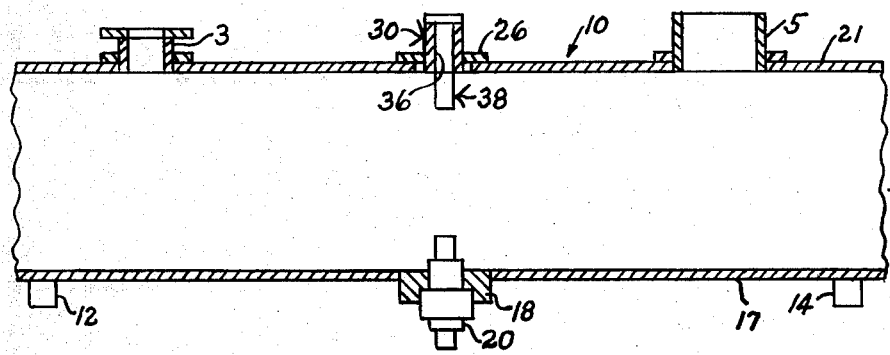
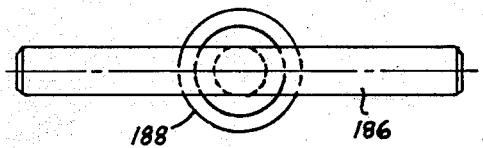

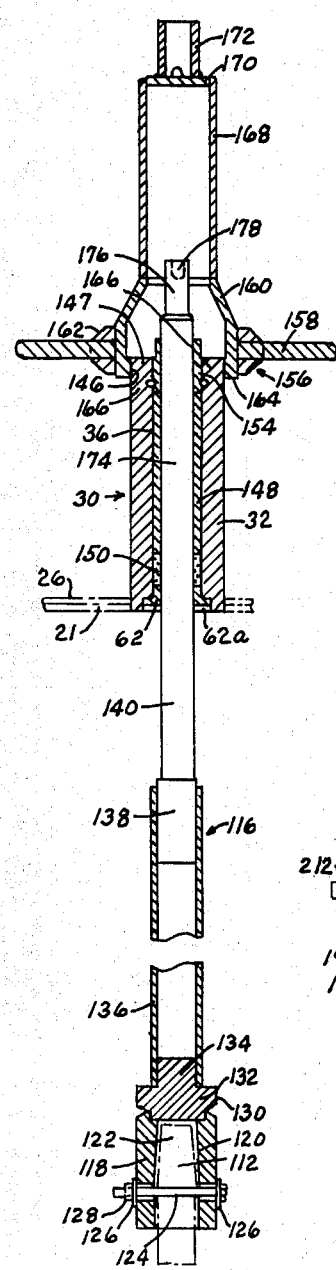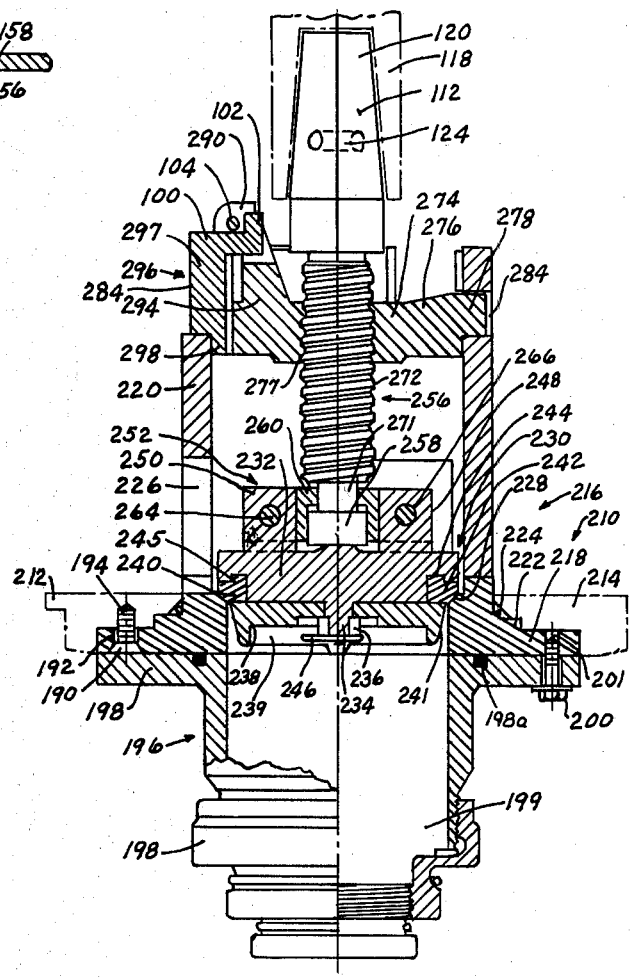

LIGHT SOURCE TO LOCATE NOZZLE IN TANK

BACKGROUND OF THE INVENTION

In the past, considerable difficulty has occured in assembling tanks in attempting to align the nozzle or top operator guide located in the top of the tank with the outlet valve located in the bottom of the tank. An operating rod extends through the nozzle to operate the lading valve in the tank bottom. This method of building tanks often results in a vertical multi-directional misalignment between the nozzle and the lading valve of between ½° to 3°.

Misalignment in turn causes the packing in the nozzle to be moved to one side due to the binding of the upper part of the operating rod in the nozzle, enabling commodity to bypass the packing. This also reduces the service life of the packing, valve stem and sleeve.

One way to avoid this alignment problem is to use a solid rod fixture bolted to the bottom of the tank which establishes and protrudes through the opening in the top of the tank and which receives the nozzle prior to tack welding the nozzle to a nozzle reinforcing pad. However, the use of this heavy rod fixture is awkward.

Workmen with gun sights located on top of the tank have also attempted to sight a target located on the bottom outlet mounting flange in the tank bottom, and tack welding the nozzle to the nozzle reinforcing pad when the target is sighted. However, such sighting is time consuming, particularly in limited lighting in tank assembly plants which makes this technique difficult. It is even more difficult when shifts are operating during the darkness hours.

SUMMARY OF THE INVENTION

An opening is formed in a tank bottom and a mounting flange for a bottom outlet valve is attached to the tank bottom extending into this opening. This valve mounting flange contains fastener openings. A vertically extending light source is removably attached to the mounting flange, for example with mechanical fasteners. The light source is shined upwardly into the tank and indicates a reference point on the internal surface of the tank top for locating the nozzle opening. This reference point is marked, and a top opening is then formed in the tank shell by workmen located in the tank, usually after rotating the tank 180°. If the tank has been rotated prior to forming the top opening, the tank is again rotated 180° to locate the top opening at the top of the tank. An optional reinforcing plate is then welded to the outside surface of the tank surrounding the top opening. This reinforcing plate contains a reinforcing plate opening. A hollow cylindrical nozzle is then located within the reinforcing plate opening and/or the tank top opening. An alignment fixture including a target is then inserted into the nozzle. The light source from below the tank bottom is then shined into the nozzle and onto the target located in the nozzle. When the light source is pointed at the center portion of the target, the nozzle is tack welded to the tank top and/or reinforcing plate. The light source is then removed from the mounting flange, and the fixture is removed from the nozzle. The nozzle is then finish welded to the reinforcing plate and/or to the tank shell. A seal assembly and an operating rod are then inserted into the nozzle. The operating rod is connected to a lading valve in the tank bottom in a known manner.

IN THE DRAWINGS

FIG. 5 is a vertical sectional view with the tank rotated 180° with respect to FIG. 4, with the light source at the bottom and a reinforcing plate located about the tank top opening.

FIG. 6 is a vertical sectional view illustrating a nozzle temporarily located within the tank top opening.

FIG. 8 is a vertical sectional view of an operating rod extending through the nozzle and connected to a lading valve located in the tank bottom opening.

FIG. 9 is a view of the lading valve located within the tank bottom opening. It will be apparent that FIG. 8 is a continuation of the upper portion of FIG. 9, as indicated by the arrows connecting FIGS. 8 and 9.

FIG. 10 is a detail view of a handle adopted to be utilized in lowering the operating rod to connect the operating rod to the lading valve.

FIG. 11 is a top view of FIG. 10.

DESCRIPTION OF PREFERRED EMBODIMENTS

Figure 1:
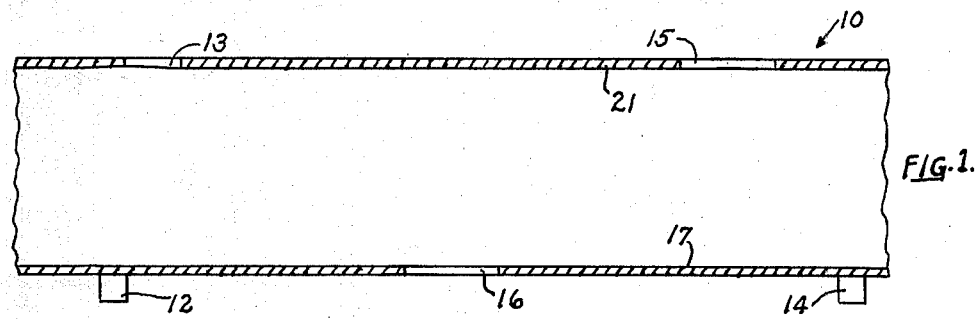
FIG. 1 is a vertical sectional view illustrating a bottom opening in the tank.
Figure 2:
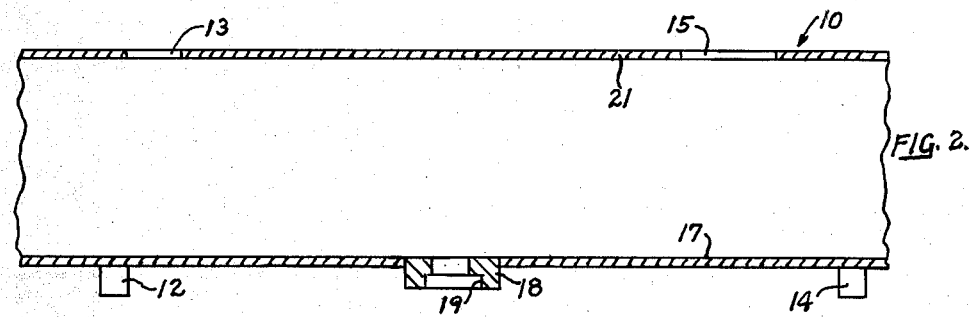
FIG. 2 is a vertical sectional view illustrating locating a mounting flange within the bottom opening.
Figure 3:
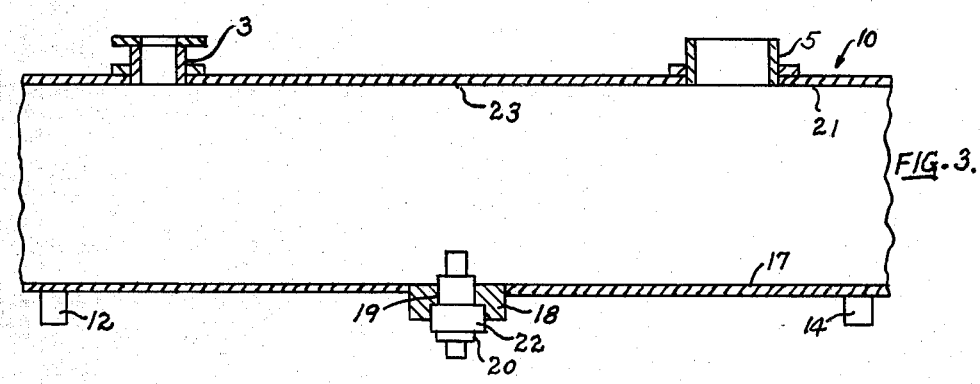
FIG. 3 is a vertical sectional view illustrating a light source mounted on the mounting flange and illustrating a man-way and a safety valve.

In the drawings a tank 10 for example, for a transportation vehicle such as a railway tank car, is placed upon rollers 12 and 14 during assembly. Openings 13 and 15 are cut in the tank top for the safety vent and manway openings. An opening 16 is cut in the tank bottom 17. A safety vent 3 and a man-way fitting 5 are then welded into openings 13 and 15. A mounting flange 18 having a stepped slot 19 is welded into the opening 16. A light source 20 having a flange portion 22 is bolted into place in the slot 19 of the flange portion 18 (FIG. 3). The light source is mounted so that it is perpendicular to the flange portion 18. The flange portion in turn is accurately located as being parallel to the bottom of the tank and flat. The light source is shown upwardly and a reference point 23 on top of the tank in direct alignment with the center of the opening 16 in the flange is located.

Figure 4:
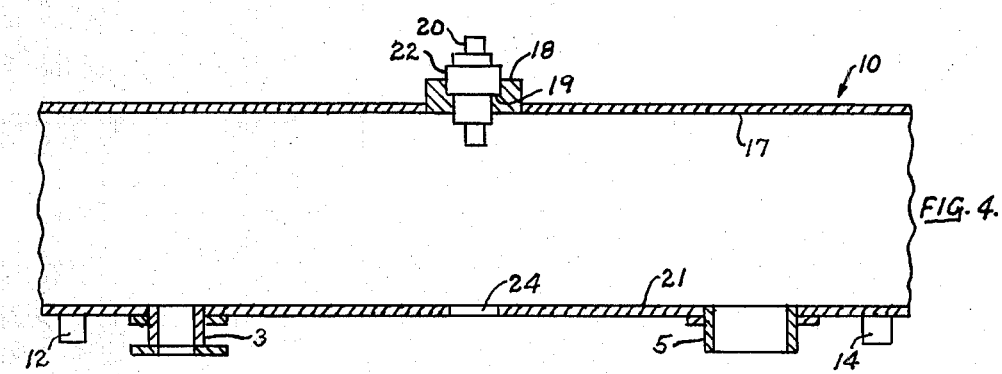
FIG. 4 is a vertical sectional view with the tank rotated 180° with the light source at the top and an opening burned out in the tank top.

The tank is then rotated 180° (FIG. 4) by means of the rollers 12 and 14, and a hole 24 approximately 3" in diameter is burned out of the tank top 21.

Figure 7:
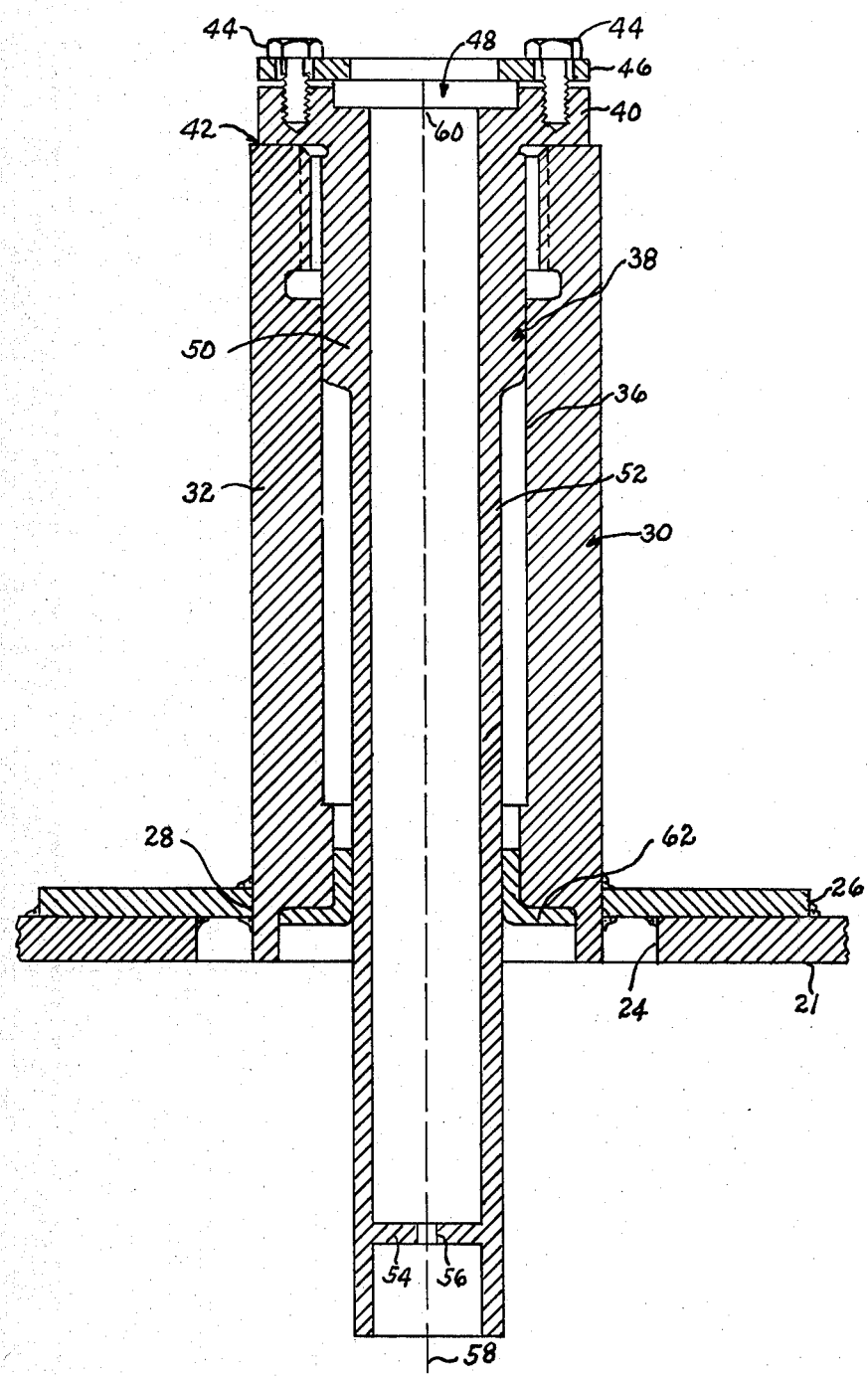
FIG. 7 is a detail vertical sectional view of the nozzle and alignment fixture.

The tank is again rotated 180° (FIG. 5) to locate the mounting flange 18 on the bottom of the car and the opening 24 at the top. At the top of the tank a reinforcing pad 26 is welded to the tank top 21 about the opening 24. Pad 26 includes an opening 28. A nozzle 30 is loosely fitted within openings 24 and 28. Nozzle 30 includes body portion (FIG. 7) extending upwardly from the tank top 21 and from reinforcing plate 26. Nozzle 30 includes slot 36 to receive a target fixture 38. Target fixture 38 includes a flange portion 40 which abuts the nozzle top 42. Removable fasteners 44 extending downwardly through mounting plate 46 hold in place target 48. Target fixture 38 includes a body portion 50 extending downwardly through the nozzle 30 and includes a portion of reduced diameter 52 extending downwardly and into the tank below tank top 21. Portion 52 includes a transverse plate 54 having an alignment aperture 56 adopted to receive a light beam 58 from the light source 20 in the tank bottom. Target 48 includes a bulls eye 60. The lower portion of the nozzle includes a stainless steel insert 62 through which target portion 52 extends.

The light source used may be a high intensity conventional bulb or a neon bulb. A particularly preferred light source is a lazer beam.

The light source 20 is turned on and shined upwardly toward the tank top 21. The attendant at the top of the tank tilts, rotates, and/or moves laterally, the loosely fitting nozzle relative to the tank opening 24 and the reinforcing pad opening 28 until the light beam aligns with the aperture 56 and the bulls eye 60. At this time, the nozzle is temporarily attached to the reinforcing pad 26 and/or to the tank 21. This is conveniently done by tack welding. However, it can also be done with mechanical fasteners.

The target fixture 38 is then removed from the nozzle 30. At the bottom of the tank, light source 20 is removed from mounting flange 18. The nozzle 30 is then firmly connected to the reinforcing pad 26, for example by finish welding.

Nozzle 30 includes a locating plate 62 having an opening 62a. A packing or seal 150 and a spacer 148 are inserted into nozzle slot 36 and are held in place by a cap 154 extending into upper threaded portion 166. An operating rod 140 is then inserted into the assembly extending downwardly to a bottom outlet valve as described in application Ser. No. 142,309 hereby incorporated into the present application by this reference. Rod 140 is connected to a bottom outlet valve in the manner described in detail in Ser. No. 142,309. As is described in greater detail in this application, and shown in FIG. 8, stem 256 includes a non-round connection portion 112 and an opening 124. Operating rod 140 includes a lower portion 116 including pipe 136 and rod 118 having an opening 120 adapted to receive the stem portion 112. It is to be noted that the stem portion is rounded at 122 to provide freedom of movement of the stem relative to the rod connecting portion 118, similar to a universal joint. A fastener 124 together with washers 126 and a nut 128 hold the stem portion 112 in engagement with the rod 118.

Rod 118 is welded to a connecting member 130 having a rectangular portion 132 and a circular portion 134 which extends within a pipe 136 which extends upwardly toward the top of the tank. Operating rod 140 includes a lower cylindrical portion 138 which extends within pipe 136.

An operating handle assembly 156, which can also be a one piece casting, includes a handle portion 158 and a body portion 160 jointed together with gussets or ribs 162. Handle body portion 160 includes a threaded portion 164 which engages threaded portion 166 of casing 32. Handle body portion 160 is welded to a tubular member 168 and a closure plate 170 is welded to the tube 168 at its upper end. A non-round operating portion 172 is welded to the plate 170.

Operating rod 140 includes a circular portion 174 extending within packing 150 and guide 148. At the upper end of circular portion 174 a non-round connection portion 176 is provided. The connection portion 176 is of smaller cross section than is the handle connection portion 172. Therefore when the handle assembly 156 is removed from the threaded casing 146, the handle connection portion 172 is inserted over the rod connection portion 176 and the valve assembly at the bottom of the tank may be rotated by virtue of the handle assembly 156.

It will be noted that rod connection portion 176 includes a threaded connection slot 178. A bottom installation operator 180 (FIGS. 10 and 11) is provided which is utilized to raise and lower the valve assembly in the bottom of the tank during installation or removal of the valve assembly from the bottom of the tank. This handle assembly includes a threaded projection 182 which extends within the slot 178 in the handle portion 174. A circular body portion 184 extends upwardly from projection 182 and, at its opposite end, an operating handle portion 186 is provided. This operating handle includes a cylindrical skirt 188 and a reinforcing cylinder 189 welded to handle portion 186 and to the skirt. The skirt functions as a stop which engages the top of the nozzle at the lowermost point to which the rod can descend below the tank for attachment to the stem.

In operation, in order to install the bottom operable valve assembly of the present invention, the handle assembly 180 is connected to the exposed rod 174 with connection portion 182 threaded into threaded connection slot 178. The attendant then lowers operating rod 140 to the lowest extent possible, until stop skirt 188 engages casing top 147. At this point, rod portion 118 is extending below the bottom flange 214 as shown in FIG. 9. With the bottom operable valve assembly assembled as shown in FIG. 9, and described above, the valve stem 112 is extended into the slot 120 of rod portion 118 and the fastener 124, washers 126 and nut 128 attached, as shown in FIG. 8. If there is an attendant on the top of the tank, this attendant then raises the connected assembly upwardly until the flange portion 218 engages the tank bottom mounting flange 214. The upper operating portion 174 will readily slide through the guide 148. It is possible for a single attendant to raise the valve assembly from the bottom because the assembly and rod only weigh 70–80 pounds. When the flange portion 218 engages the tank mounting flange 214, countersunk valve assembly fasteners 190 are inserted from the bottom into openings 192 in the valve flange, and openings 194 in the tank bottom mounting flange. It is thus seen that the valve assembly of the present invention is installable from outside the tank from the bottom, and the attendant need not enter the tank to install this assembly. Thus the undesirable situation of the attendant working inside the tank is avoided both for initial installation and for repairs and/or retrofit.

An outlet chamber 196 having a flange 198 and a seal 198a is then attached to flange portion 218 with fasteners 200 extending into openings 201 preferably located on the same bolt circle as fasteners 190. Fasteners 200 are of the type which will shear off upon hard impact to the outlet chamber 196. Obviously this outlet chamber would be removed before attempting to install a new lading valve operable from the top. Thus it is not necessary to provide a skid for this assembly as required in certain AAR and DOT regulations concerning projections of the tank bottom in excess of one (1) inch. A threaded cap 198 closes on opening 199 in the bottom of the outlet chamber. The lading is removed from the tank by means of a suitable discharge conduit (not shown) connected to the outlet chamber 196 in a known manner. Valve closure 232 is moved between open and closed position by rotation of handle assembly 156 with handle connection portion 172 engaging operating rod connection portion 176.

To complete the embodiments shown in FIG. 9, a railway tank car 210 includes a tank bottom 212 having a tank mounting flange 214. A combination valve mounting flange, valve cage and valve seat indicated generally at 216 is provided. This includes a flange portion 218 extending radially outwardly from a valve cage portion 220. Flange portion 218 includes a step 222. An O ring seal 224 is provided between the mounting flange 214 and the valve flange 218.

Cage portion 220 includes a plurality of openings 226 for lading flow. A valve seat 228 is provided on the inner surface of flange portion 218.

A valve closure 230 includes a body portion 232 having depending therefrom a stud 234. Stud 234 is threaded and receives a threaded nut 236 which holds a seal retainer 238 in engagement with a circumferential seal 240 located in a slot 242. Slot 242 includes an upper portion 244 and seal 240 includes an upper portion 245 to prevent loss of seal from the closure, in the event the seal becomes bound to the valve seat 228. A cotter pin 246 extending through stud 234 and nut 236 is used to hold the nut in place. Seal retainer 238 includes a slot 239 to save weight, and a depending valve guide portion 241 to guide movement of closure 230 toward the cage center while closing the valve.

Valve closure 230 further includes a pair of upwardly extending lugs 248 and 250. A stem clamp assembly 252 engages either side of lugs 248 and 250. A stem 256 includes a lower circular portion 258 which is located within semi-circular portion 260 of clamp assembly 252. Bolts 264 and 266 hold the clamp assembly in engagement with lugs 248 and 250 and semi-circular portion 260 in engagement with stem circular portion 258. The stem 256 is integrally connected to the valve closure 230.

Stem 256 further includes a portion of reduced cross section 271 and a threaded body portion 272. A sleeve 274 includes body portion 276 having a threaded opening 277 which is attached to threaded stem portion 272. Sleeve 274 further includes a plurality of radial arm portions 278. When the assembly of the valve closure stem retainer clamps and stem are inserted into the valve cage portion 220, the arm portions 278 fit within slots 284 in the valve cage. A pair of lugs 290 extend upwardly and outwardly from a lug base portion 294 which is integral with sleeve body portion 276. Lugs 290 are thus located over one of cage slots 284.

A key 296 includes a body portion 297 generally in the form of a partial cylinder and includes a lower stem 298 which extends partly down cage wall 220. Key 296 further includes an upper radial portion 100 extending inwardly of the cage and an upper extension 102. Lower step 298 and upper extension 102 tend to cause key 296 to move inwardly toward the center of the cage rather than outwardly and out of the cage. However, key 296 is trapped both vertically and laterally by means of a cotter pin 104 which extends through openings 290a and lugs 290.

Once the valve closure stem 256 and sleeve 274 have been located within the cage 220 with the seal 240 engaging the seat 228, and the sleeve arms 278, key 296 and cotter 104 in place, the stem can then be connected to operating rod 140 extending to the top of the tank, as described above.

It is seen, however, that the use of the light source to align the opening in the top of the tank and the nozzle to be located within the opening in the top of the tank is a relatively simple and quick method of achieving the necessary alignment.

Top operated bottom tank car valves in which the assembly has been aligned with the technique of the present invention have not experienced the leakage problems and the wear problems which have occured with prior art constructions where substantial misalignment exists between the nozzle and the bottom outlet valve.

What is claimed is:

1. A method of aligning a tank bottom member with a tank top member comprising: forming a bottom opening in a tank bottom; attaching a mounting flange for the bottom member to the tank bottom into said bottom opening; removably attaching a vertically extending light source to the mounting flange; shining the light source upwardly into the tank to indicate a reference point on the internal surface of the tank for locating a tank top opening; marking the reference point; forming a top opening in the tank top at the reference point; locating a tank top member within the tank top opening; said tank top member being hollow; inserting a removable target fixture into said tank top member; shining the light source from the tank bottom onto the target located in the tank top member; and when the light beam in the tank top member is pointed at the center portion of the target, at least temporarily attaching the tank top member to the tank top.

2. A method according to claim 1, including removing the light source from the tank bottom and removing the target fixture from the tank top member.

3. A method according to claim 2, including integrally attaching a reinforcing plate to the outside surface of the tank surrounding the tank top opening prior to inserting said target fixture into said tank top opening.

4. A method according to claim 3, including welding the top member to the reinforcing plate.

5. A method according to claim 1, wherein said tank is rotated 180° prior to forming said tank top opening.

6. A method according to claim 5, including rotating the tank 180° after forming the tank top opening to return the tank top to a position above the tank bottom.

7. A method according to claim 1, wherein said light source is removably attached to said mounting flange with fastener openings located within said mounting flange.

8. A method of aligning a tank nozzle with a bottom opening in a tank bottom comprising: forming a bottom opening in a tank bottom; attaching a mounting flange for a bottom fitting for the tank bottom into the bottom opening; removably attaching a vertically extending light source to said mounting flange; shining the light source upwardly into the tank to indicate a reference point on the internal surface of the tank top for locating a nozzle opening; marking the reference point; forming an opening in the tank top at the reference point; attaching a reinforcing plate to the outside surface of the tank surrounding the tank top opening; said reinforcing plate containing a reinforcing plate opening; locating a nozzle within the reinforcing plate opening; inserting a target fixture into said nozzle; said nozzle being hollow; shining the light source from below the tank bottom onto the target located in the nozzle; and when the light source in the nozzle is pointed at the center portion of the target, at least temporarily attaching the nozzle to the reinforcing plate.

9. A method according to claim 8, including rotating the tank 180° prior to forming the tank top opening.

10. A method according to claim 9, including rotating the tank 180° after forming the tank top opening to return the tank top to a position above the tank bottom.

11. A method according to claim 8, including removing the light source from the tank bottom and removing the target fixture from the nozzle.

12. A method according to claim 11, including finish welding the nozzle to the reinforcing plate and to the tank shell.

13. A method according to claim 11, including extending an operating rod into the nozzle and connecting the operating rod to a lading valve located in the tank bottom opening.

14. An apparatus for aligning a tank bottom member with a tank top member comprising: a bottom opening in a tank bottom; a mounting flange for a bottom member located within said bottom opening; a vertically extending light source removably attached to said mounting flange; a top opening in the tank top; a reinforcing plate attached to the outside surface of the tank surrounding the tank top opening; said reinforcing plate containing a reinforcing plate opening, a tank top member loosely fitting within said tank top opening; said tank top member being hollow; a removable fixture located within said tank top member; a target located in said target fixture; said source adopted to shine a light upwardly into the tank and onto said target, whereby when the light beam shining into the tank top member is pointed at the center portion of the target; said tank top member may be temporarily attached to said tank top.

15. Apparatus according to claim 14, wherein said light source is removably attached to said mounting flange with fasteners extending into said mounting flange.

16. An apparatus for aligning a tank nozzle with a bottom opening in a tank bottom comprising: a bottom opening in a tank bottom; a mounting flange for a bottom fitting located within said bottom opening; a vertically extending light source removably attached to said mounting flange; a tank top opening located in the tank top; a nozzle loosely fitting within tank top opening; said nozzle being hollow; a target fixture located within said nozzle; a target located within said fixture; said light source adapted to shine upwardly from below the tank bottom onto said target when said light is pointed at the center portion of the target; said nozzle may be temporarily attached to said tank top.

17. Apparatus according to claim 16, including a reinforcing plate located on said tank top having an opening therein through which said light source passes to shine upon said target.

18. Apparatus according to claim 17, wherein the nozzle is finish welded to the reinforcing plate.

19. A method according to claim 4, including welding the top member to the reinforcing plate and to the tank shell.

20. Apparatus according to claim 18, wherein the nozzle is finish welded to the reinforcing plate and to the tank shell.

* * * * *